July 3, 1928. 1,676,120
J. VIBBER
TRACTOR DEVICE
Filed Sept. 28, 1925  2 Sheets-Sheet 2
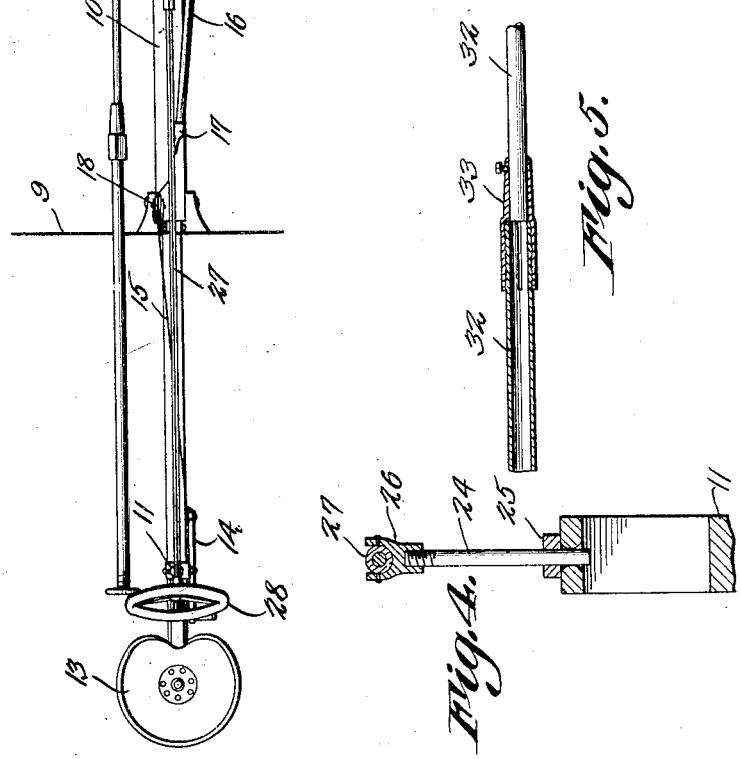

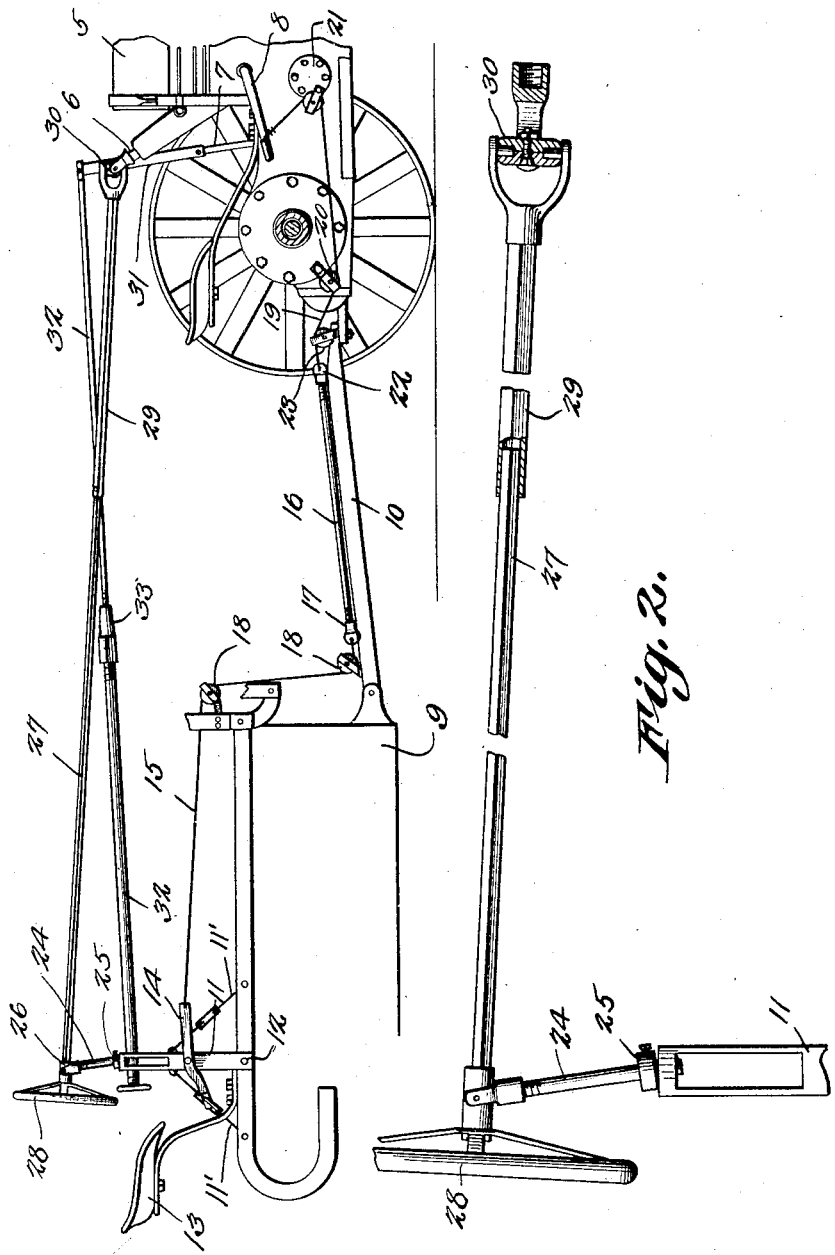

Patented July 3, 1928.

1,676,120

UNITED STATES PATENT OFFICE.

JOHN VIBBER, OF BRECKENRIDGE, MICHIGAN.

TRACTOR DEVICE.

Application filed September 28, 1925. Serial No. 59,141.

This invention relates to an attachment for use in connection with tractors, the primary object of the invention being to provide extensible control rods whereby a person seated on an agricultural machine drawn by the tractor, may control the operation of the tractor from his seat on the agricultural machine, with facility.

An important object of the invention is to provide a controlling device which may be adjusted, adapting the controlling device for use in connection with various types of agricultural machines.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view illustrating a controlling device constructed in accordance with the invention as applied to an agricultural machine.

Figure 2 is an enlarged detail view of the steering wheel control.

Figure 3 is a plan view of the controlling mechanism.

Figure 4 is a sectional view through the movable support for the steering wheel control.

Figure 5 is a sectional detail view illustrating the adjustable connection between the sections of the clutch lever control.

Figure 6 is a sectional view through the universal connection employed between the steering post and adjustable control rod.

Referring to the drawings in detail, the reference character 5 indicates a tractor which is of the usual and well known type, the same being provided with the usual steering post 6, gear shifting lever 7 and clutch pedal 8.

The reference character 9 indicates an agricultural machine which may be of any type, and which is pulled by the tractor, by means of the usual draw bar 10 which is connected to the tractor and agricultural machine in the well known manner.

The invention embodies certain control rods and levers to facilitate the control of the tractor from the operator's seat of the agricultural machine drawn by the tractor, to the end that one person may operate the tractor and mechanism of the agricultural machine used. In carrying out the invention, a vertical arm 11 is employed, the same being secured to the frame of the agricultural machine by means of bolts 12, the arm 11 being however arranged adjacent to the operator's seat which is indicated at 13, so that the elements supported thereby will be accessible to the operator positioned on the seat 13.

Bracing rods 11' connect with the arm 11 the bracing rods being provided with turn buckles so that the arm 11 may be adjusted for the convenience of the operator. Pivotally mounted on the arm 11 is a foot lever 14 to which one end of the cable 15 is secured, the opposite end of the cable 15 being connected to one end of the rod 16 as at 17, the intermediate portions of the cable 15 operating over pulleys 18 as shown by Figure 1 of the drawings.

Connected with the clutch pedal 8 is a cable 19 that operates over pulley 20 that is secured by one of the bolts employed for securing the usual foot rest plate 21 to the tractor. The opposite end of the cable 19 connects with one end of the rod 16 as at 22, portions of the cable 19 being also shown as operating over pulleys 23 to eliminate binding of the cable while in operation and to permit the operation of the clutch pedal 8 with the minimum amount of exertion on the part of the operator.

At the upper end of the arm 11 is an opening that receives the lower end of the rod 24, there being provided a collar 25 on the rod 24 which collar rests on the upper end of the arm 11 to adjustably support the rod 24 so that the steering wheel and rod supported thereby, may be properly adjusted for the convenience of the operator.

Mounted on the upper end of the rod is a movable bearing 26 through which the rod 27 operates, the rod carrying the usual steering wheel 28 at its free end. The opposite end of the rod 27 is adjustably held in the hollow shaft 29, the rod 27 being square in cross section and fitted in a squared opening in the hollow shaft 29 so that rotary movement of the rod 27 produces a relative rotary movement of the shaft 29.

A universal joint indicated at 30 connects one end of the hollow shaft 29 to the steering post 6 whereby rotary movement of the shaft 29 will operate the steering post to guide the tractor. Positioned on the clutch lever 7 is an extension arm 31 to which the rod 32 is connected which rod is constructed in sections which are connected by means of the sleeve 33.

From the foregoing it will be obvious that due to this construction, an operator positioned on the seat of an agricultural machine may efficiently control the operation of the tractor or power device from the operator's seat of the agricultural machine, thereby enabling a single person to not only control the movements of the tractor, but control the mechanism of the agricultural machine operated thereby.

It will further be seen that the elements of the attachment may be readily disassembled so that the tractor may be employed for accomplishing various purposes.

I claim:—

A steering mechanism for steering a tractor from a point adjacent to a machine drawn by the tractor, comprising a steering rod embodying telescoping sections, means for securing one of the sections to the steering post of the tractor, a vertical arm secured to the machine drawn by the tractor, said arm having an enlarged opening formed in the upper portion thereof, a rod having pivotal connection with the steering rod, extended into the opening of the vertical arm, an adjustable collar mounted on the last mentioned rod, and resting on the upper end of the vertical arm, means for securing the collar rod in various positions of adjustment, and a wheel forming a part of the steering mechanism.

In testimony that I claim the foregoing as my own, I have hereto affixed my signature.

JOHN VIBBER.